(12) United States Patent
O'Keefe

(10) Patent No.: US 11,859,043 B2
(45) Date of Patent: Jan. 2, 2024

(54) MOISTURE-CURABLE SILYLATED POLYMER RESIN COMPOSITION WITH REDUCED MOISTURE SENSITIVITY

(71) Applicant: MOMENTIVE PERFORMANCE MATERIALS INC., Waterford, NY (US)

(72) Inventor: Brendan O'Keefe, Waterford, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 550 days.

(21) Appl. No.: 16/931,796

(22) Filed: Jul. 17, 2020

(65) Prior Publication Data

US 2022/0017683 A1    Jan. 20, 2022

(51) Int. Cl.

| | |
|---|---|
| *C08G 18/71* | (2006.01) |
| *C08G 18/22* | (2006.01) |
| *B01J 31/22* | (2006.01) |
| *C08G 18/10* | (2006.01) |
| *C08G 18/38* | (2006.01) |
| *C08G 18/48* | (2006.01) |
| *C08G 18/75* | (2006.01) |
| *C08L 75/04* | (2006.01) |

(52) U.S. Cl.
CPC ........ *C08G 18/718* (2013.01); *B01J 31/2213* (2013.01); *C08G 18/10* (2013.01); *C08G 18/222* (2013.01); *C08G 18/3893* (2013.01); *C08G 18/4845* (2013.01); *C08G 18/755* (2013.01); *C08L 75/04* (2013.01); *B01J 2531/38* (2013.01); *C08G 2150/00* (2013.01); *C08G 2170/00* (2013.01)

(58) Field of Classification Search
CPC .... C08G 18/718; C08G 18/10; C08G 18/222; C08G 18/3893; C08G 18/4845; C08G 18/755
See application file for complete search history.

(56) References Cited

U.S. PATENT DOCUMENTS

| | | | |
|---|---|---|---|
| 5,733,945 A | 3/1998 | Simpson | |
| 5,990,257 A | 11/1999 | Johnston et al. | |
| 7,319,128 B2 | 1/2008 | Ziche et al. | |
| 7,569,653 B2* | 8/2009 | Landon | C08G 18/10 528/65 |
| 9,321,978 B1 | 4/2016 | Mayfield | |
| 2015/0166719 A1 | 6/2015 | Huang et al. | |
| 2017/0174840 A1* | 6/2017 | Dinkar | C09J 183/04 |
| 2020/0339729 A1 | 10/2020 | Stempfle et al. | |

FOREIGN PATENT DOCUMENTS

| | | | |
|---|---|---|---|
| DE | 102004012876 A1 | 10/2005 | |
| EP | 3501642 A1 | 6/2019 | |
| JP | 5076404 B2 | 11/2012 | |
| WO | WO-2013013111 A1 * | 1/2013 | ............. C08L 83/04 |
| WO | 2019121351 A1 | 6/2019 | |

OTHER PUBLICATIONS

International Search Report and Written Opinion from PCT/US2021/041912 dated Nov. 5, 2021.

* cited by examiner

*Primary Examiner* — Michael L Leonard
(74) *Attorney, Agent, or Firm* — James C. Abruzzo

(57) ABSTRACT

There is provided herein a silylated polyurethane composition, a process of preparing a silylated polyurethane polymer, and an adhesive, sealant or coating containing a silylated polyurethane made therewith.

27 Claims, 1 Drawing Sheet

Chart 1

Chart 1
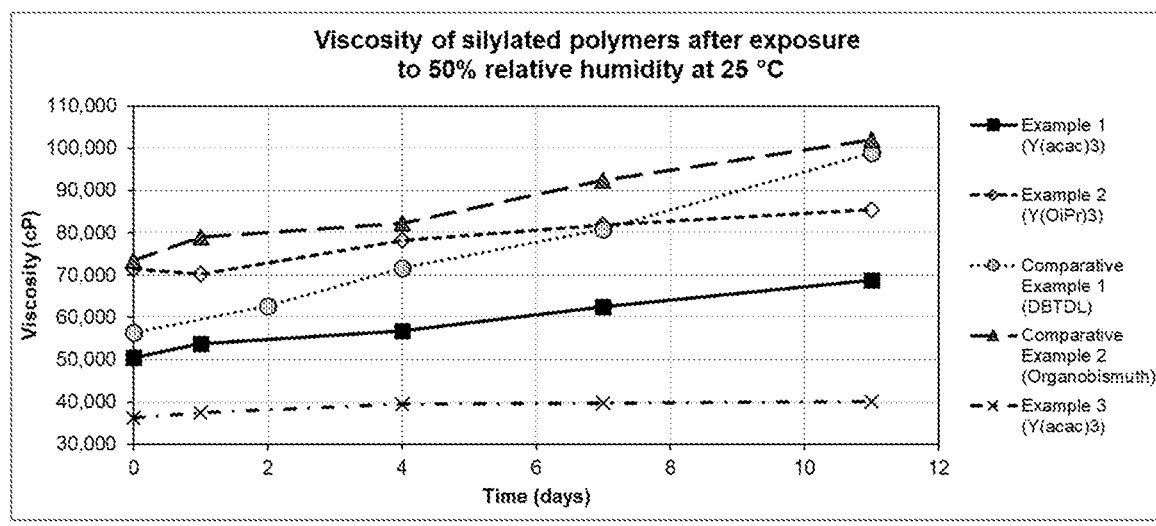

MOISTURE-CURABLE SILYLATED POLYMER RESIN COMPOSITION WITH REDUCED MOISTURE SENSITIVITY

FIELD OF THE INVENTION

The present invention relates to silylated polyurethane compositions prepared using yttrium-containing catalysts which exhibit reduced sensitivity to moisture and increased storage stability. The silylated polyurethane compositions can be used to produce coatings, adhesives and sealants which can be used in construction and building applications as well as others.

BACKGROUNDS OF THE INVENTION

Silylated polymers are well known and are commonly used to make moisture-curable formulations. Numerous methods are known for preparing silylated polymers. One method involves the reaction of a polymer containing isocyanate-reactive end-groups with an isocyanatosilane. Another method involves the reaction of a polymer containing isocyanate end-groups with aminosilanes or mercaptosilanes. Typically, these reactions are performed using urethane-forming catalysts, i.e. catalysts that promote the isocyanate reaction with active hydrogen-containing compounds.

Known urethane-forming catalysts include, for example, dialkyltin compounds, metal complexes (chelates and carboxylates) of bismuth and zinc and tertiary amine compounds.

A disadvantage of many known urethane-forming catalysts for preparing silane-crosslinkable polyurethane polymers is that these polymers need to be handled under conditions which exclude moisture, otherwise these polymers can increase in viscosity or even form a gel, thus making the polymers unusable. In an industrial setting, complicated procedures to exclude moisture must be used thus adding to the costs of manufacturing and using these polymers.

Further, many tin-containing compounds are toxic and therefore their use has been restricted with the possibility that they may even become banned in the future.

Accordingly, it is an object of the present invention to provide a process for the preparation of silylated polyurethane polymers having reduced sensitivity to moisture employing non-tin urethane-forming catalysts.

SUMMARY OF THE INVENTION

The current invention overcomes the aforementioned drawbacks by employing an yttrium-containing catalyst, which results in silylated polyurethane polymers having reduced sensitivity to moisture and increased storage stability compared to the same silylated polyurethane polymers prepared using non-yttrium containing catalysts.

In an aspect, the present invention relates to a silylated polyurethane composition comprising a polymer of formula (I):

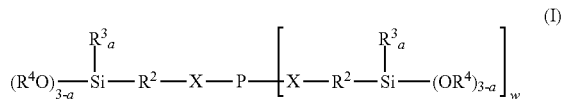

where P is a polymer; X is a urethane, urea or thiourea; $R^2$ is a divalent alkylene group of up to 12 carbon atoms, optionally containing one or more heteroatoms, each $R^3$ is the same or different alkyl or aryl group of up to 8 carbon atoms, each $R^4$ is the same or different alkyl group of up to 6 carbon atoms, w is greater than or equal to 1, and a is 0, 1 or 2; and, an yttrium-containing catalyst.

There is also provided herein a process for the preparation of silylated polyurethane polymer (i) from the reaction of polyol (ii) and/or hydroxyl-terminated polyurethane prepolymer (iii) with isocyanatosilane silylating agent (iv), or the reaction of polyisocyanate (v) and/or isocyanate-terminated polyurethane prepolymer (vi) with active hydrogen-containing silylating agent (vii), the process comprising:

employing at least one yttrium-containing catalyst (viii) for the preparation of the hydroxyl-terminated polyurethane prepolymer (iii), isocyanate-terminated polyurethane prepolymer (vi) and/or silylated polyurethane polymer (i).

BRIEF DESCRIPTION OF THE DRAWING

Chart 1 is a graph of the viscosity of silylated polymers after exposure to 50% relative humidity at 25° C. over time.

DETAILED DESCRIPTION OF THE INVENTION

It has been found that by employing an yttrium-containing catalyst, the resulting silylated polyurethane polymers unexpectedly exhibit reduced sensitivity to moisture and an increased storage stability compared to the same silylated polyurethane polymers prepared using non-yttrium containing catalysts. The silylated polyurethane can be made without using conventional tin or bismuth catalysts. The silylated polyurethane can be used to make coatings, adhesives, sealants and the other applications described herein.

Other than in the working examples or where otherwise indicated, all numbers expressing amounts of materials, reaction conditions, time durations, quantified properties of materials, and so forth, stated in the specification and claims are to be understood as being modified in all instances by the term "about" whether or not the term "about" is used in the expression.

It will be understood that any numerical range recited herein includes all sub-ranges within that range and any combination of the various endpoints of such ranges or sub-ranges, be it described in the examples or anywhere else in the specification.

It will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

In accordance with the present invention, the silylated polyurethane composition comprises the reaction product of the components for forming a moisture-curable silylated polyurethane resin, which upon curing, provides a cured resin i.e., hydrolyzed and subsequently crosslinked, silylated polyurethane resin.

In one embodiment herein the silylated polyurethane composition employed in the present invention in general is obtained by reacting the reaction-forming components therefore, as noted herein, with an yttrium-containing catalyst. The reaction of the components in the forming of the silylated polyurethane composition in the presence of the yttrium-containing catalyst may involve one or more of several different reaction routes for forming the silylated polyurethane.

In an embodiment, the silylated polyurethane composition comprises (a) the reaction product of a polyurethane prepolymer and a silylating agent in the presence of an yttrium-containing catalyst, optionally in combination with one or more other polyurethane-forming catalysts, such as, but not limited to zinc, titanium, zirconium and the like. The nature of the silylating agent will depend on the termini of the polyurethane prepolymer, i.e., whether the prepolymer is hydroxyl-terminated or isocyanate-terminated. In the case of the prepolymer being hydroxyl-terminated, the silylating agent will be an isocyanate-containing silylating agent. In the case of the prepolymer being isocyanate-terminated, the silylating agent will have an active hydrogen moiety, such as mercaptan, primary and secondary amine, preferably the latter, etc. and can be a silyl-hydride containing silylating agent.

Alternatively, in another embodiment the silylated polyurethane composition comprises (b) the reaction product of a polyol and an isocyanatosilane in the presence of an yttrium-containing catalyst, optionally in combination with one or more other polyurethane-forming catalysts, such as, but not limited to, zinc, titanium, zirconium and the like.

Still further, in yet another embodiment the silylated polyurethane composition comprises (c) the reaction product of a polyisocyanate, an active hydrogen-containing silane, such as those described herein, in the presence of an yttrium-containing catalyst, optionally in combination with one or more other polyurethane-forming catalysts, such as, but not limited to zinc, titanium, zirconium and the like.

In preparing the polyurethane prepolymers herein, the isocyanate-terminated polyurethane prepolymers may be obtained by reacting one or more polyols, advantageously, diols, with one or more polyisocyanates, advantageously, diisocyanates, in such proportions that the resulting prepolymers will be terminated with isocyanate. In the case of reacting a diol with a diisocyanate, a molar excess of diisocyanate is employed. In an embodiment, the preparation of the isocyanate-terminated polyurethane prepolymer is conducted in the presence of an yttrium-containing catalyst as described herein.

Included among the polyols that can be utilized for the preparation of the isocyanate-terminated polyurethane prepolymer are polyether polyols, polyester polyols such as the hydroxyl-terminated polycaprolactones, polyetherester polyols such as those obtained from the reaction of polyether polyol with ε-caprolactone, polyesterether polyols such as those obtained from the reaction of hydroxyl-terminated polycaprolactones with one or more alkylene oxides such as ethylene oxide and propylene oxide, hydroxyl-terminated polybutadienes, and the like.

Specific suitable polyols include but are not limited to the polyether diols, in particular, the poly(oxyethylene) diols, the poly(oxypropylene) diols and the poly(oxyethylene-oxypropylene) diols, polyoxyalkylene triols, polytetramethylene glycols, polyacetals, polyhydroxy polyacrylates, polyhydroxy polyester amides and polyhydroxy polythioethers, polycaprolactone diols and triols, and the like. In one embodiment of the present invention, the polyols used in the production of the isocyanate-terminated polyurethane prepolymers are poly(oxyethylene) diols with molecular weights from about 500 to about 25,000. In another embodiment of the present invention, the polyols used in the production of the isocyanate-terminated polyurethane prepolymers are poly(oxypropylene) diols with molecular weights from about 1,000 to about 20,000. Mixtures of polyols of various structures, molecular weights and/or functionalities can also be used. As used herein, molecular weight is measured by Gel Permeation Chromatography (GPC) analysis.

The polyether polyols can have a functionality up to about 8 but advantageously have a functionality of from about 2 to about 4 and more advantageously, a functionality of about 2 (i.e., diols). Especially suitable are the polyether polyols prepared in the presence of double-metal cyanide (DMC) catalysts, an alkaline metal hydroxide catalyst, or an alkaline metal alkoxide catalyst, such as those which are known by those skilled in the art. Polyether polyols produced in the presence of DMC catalysts tend to have high molecular weights and low levels of unsaturation, properties of which, without wishing to be bound by theory, it is believed are responsible for the improved performance of the inventive silylated polyurethane compositions. The polyether polyols preferably have a number average molecular weight of from about 1,000 to about 25,000, more preferably from about 2,000 to about 20,000, and even more preferably in the case of polyols made using DMC catalysts, from about 4,000 to about 18,000. The polyether polyols preferably have an end group unsaturation level of no greater than about 0.04 milliequivalents per gram of polyol. More preferably, the polyether polyol has an end group unsaturation of no greater than about 0.02 milliequivalents per gram of polyol. Examples of commercially available diols that are suitable for making the isocyanate-terminated polyurethane prepolymer include but are not limited to the Acclaim® polyols available from Covestro: Acclaim® Polyol 8200 N (number average molecular weight of ~8,000), Acclaim® Polyol 4200 N (number average molecular weight of ~4,000), Acclaim® Polyol 18200 N (number average molecular weight of ~18,000), and Acclaim® Polyol 12200 N (number average molecular weight of ~12,000).

Any of numerous polyisocyanates, advantageously, diisocyanates, and mixtures thereof, can be used to provide the isocyanate-terminated polyurethane prepolymers. In one embodiment, the polyisocyanate can be diphenylmethane diisocyanate ("MDI"), polymeric diphenylmethane diisocyanate ("PMDI"), paraphenylene diisocyanate, naphthylene diisocyanate, liquid carbodiimide-modified MDI and derivatives thereof, isophorone diisocyanate ("IPDI"), dicyclohexylmethane-4,4'-diisocyanate, toluene diisocyanate ("TDI"), particularly the 2,6-TDI isomer, as well as various other aliphatic and aromatic polyisocyanates that are well-established in the art, and combinations thereof.

Silylation reactants for reaction with the isocyanate-terminated polyurethane prepolymers of reaction (a) or the polyisocyanate of reaction (c) both as described herein must contain functionality that is reactive with isocyanate and at least one readily hydrolyzable and subsequently crosslinkable group, e.g., alkoxy. Particularly useful silylation reactants are active hydrogen-containing silanes, e.g., aminosilanes, especially those of the general formula:

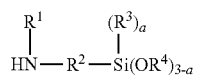

wherein $R^1$ is hydrogen, alkyl or cycloalkyl of up to 12 carbon atoms, optionally containing one or more heteroatom, or aryl of up to 8 carbon atoms, $R^2$ is a divalent alkylene group of up to 12 carbon atoms, optionally containing one or more heteroatoms, each $R^3$ is the same or different alkyl or aryl group of up to 8 carbon atoms, each $R^4$ is the same or different alkyl group of up to 6 carbon atoms and x is 0, 1 or 2. In one embodiment, $R^1$ is hydrogen or a methyl, ethyl, propyl, isopropyl, n-butyl, t-butyl, cyclohexyl or phenyl group, $R^2$ possesses 1 to 4 carbon atoms, each $R^4$ is the same or different methyl, ethyl, propyl or isopropyl group and x is 0.

Specific aminosilanes for use herein include but are not limited to aminopropyltrimethoxysilane, aminopropyltriethoxysilane, aminobutyltriethoxysilane, N-(2-aminoethyl-3-aminopropyl)triethoxysilane, aminoundecyltrimethoxysilane, and aminopropylmethyldiethoxysilane, for example. Other suitable aminosilanes include, but are not limited to phenylaminopropyltrimethoxysilane, methylaminopropyltrimethoxysilane, n-butylaminopropyltrimethoxysilane, t-butyl aminopropyltrimethoxysilane, cyclohexylaminopropyltrimethoxysilane, dibutylmaleate aminopropyltrimethoxysilane, dibutylmaleate-substituted 4-amino-3,3-dimethylbutyl trimethoxy silane, N-methyl-3-amino-2-methylpropyltriemthoxysilane, N-ethyl-3-amino-2-methylpropyltrimethoxysilane, N-ethyl-3-amino-2-methylpropyldiethoxysilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-3-amino-1-methyl-1-ethoxy)propyltrimethoxysilane, N-ethyl-4-amino-3,3-dimethylbutyldimethoxymethylsilane and N-ethyl-4-amino-3,3-dimethylbutyltrimethoxysilane.

In one embodiment the isocyanate-terminated polyurethane prepolymer can be of the formula (I):

wherein formula (I) is a polyisocyanate, or a larger polyisocyanate prepared from the reaction of a polyisocyanate and a polyol and/or a polyamine and P is an organic moiety of from 6 to 10,000 carbon atoms, which can optionally contain at least one heteroatom such as O, N or S and w is ≥1, preferably from 1 to 4.

The silylated polyurethane polymer can be prepared by reaction of the above isocyanate-terminated polyurethane (I) with an aminosilane or mercaptosilane as is known by those of ordinary skill in the art. The silylated polyurethane polymer can preferably be of the general formula (IA):

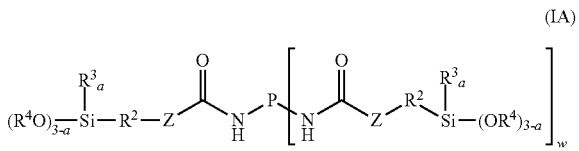

wherein P is a polymer derived from a polyisocyanate and/or a polyol, and preferably is an organic moiety of from 6 to 10,000 carbon atoms, which can optionally contain at least one heteroatom such as O, N or S, Z is S or N—$R^1$, $R^1$ is hydrogen, alkyl or cycloalkyl of up to 12 carbon atoms, optionally containing one or more heteroatoms, such as an alkyl from 1 to 8 carbon atoms, or a cycloalkyl of from 5 to 8 carbon atoms, or aryl of up to 8 carbon atoms, or aryl of up to 8 carbon atoms, $R^2$ is a divalent alkylene group of up to 12 carbon atoms, optionally containing one or more heteroatoms, preferably from 1 to 12 carbon atoms, more preferably form 2 to 8 carbon atoms, each $R^3$ is the same or different alkyl or aryl group of up to 8 carbon atoms, such as an alkyl from 1 to 8 carbon atoms, or any aryl group of from 5 to 8 carbon atoms, each $R^4$ is the same or different alkyl group of up to 6 carbon atoms, preferably from 1 to 4 carbon atoms, w is greater than or equal to 1, a is 0, 1 or 2, and w is greater than or equal to 1, and w can be up to 4.

In one embodiment herein the hydroxyl-terminated polyurethane prepolymer can be obtained in substantially the same manner employing substantially the same materials, i.e., polyols, polyisocyanates and yttrium-containing catalyst (optionally in combination with one or more other polyurethane-forming catalysts), described above for the preparation of isocyanate-terminated prepolymers, with the major difference being that the proportions of polyol and polyisocyanate will be such as to result in hydroxyl-termination in the resulting prepolymer. Thus, e.g., in the case of a diol and a diisocyanate, a molar excess of the former will be used thereby resulting in hydroxyl-terminated polyurethane prepolymer.

In one embodiment the hydroxyl-terminated polyurethane prepolymer can be produced from a polyol of the formula (II):

wherein P is an organic moiety of from 1 to 10,000 carbon atoms, such as a divalent alkyl, alkenyl, or aryl, which can optionally contain at least one heteroatom such as O, N or S. and w is ≥1, preferably from 1 to 4.

The silylated polyurethane polymer can be prepared by reaction of the above polyol with an isocyanatosilane as is known by those of ordinary skill in the art. One embodiment of a silylated polyurethane polymer is of the general formula (IIA):

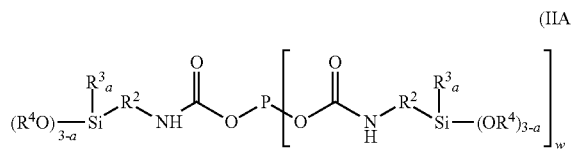

wherein P is a polymer derived from a polyisocyanate and/or a polyol, $R^2$ is a divalent alkylene group of up to 12 carbon atoms, preferably from 1 to 12 carbon atoms, more preferably form 2 to 8 carbon atoms, optionally containing one or more heteroatoms, each $R^3$ is the same or different alkyl or aryl group of up to 8 carbon atoms, such as an alkyl from 1 to 8 carbon atoms, or any aryl group of from 5 to 8 carbon atoms, each $R^4$ is the same or different alkyl group of up to 6 carbon atoms, preferably from 1 to 4 carbon atoms, w is greater than or equal to 1.

Useful silylation reactants for the hydroxyl-terminated polyurethane prepolymer in reaction (a), and for the polyol in reaction (b) are those containing isocyanate termination and readily hydrolyzable functionality, e.g., 1 to 3 alkoxy groups. Suitable silylating reactants are the isocyanatosilanes of the general formula (III):

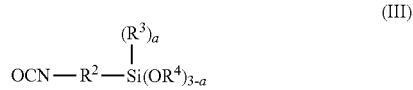

wherein $R^2$ is an alkylene group of up to 12 carbon atoms, optionally containing one or more heteroatoms, each $R^3$ is the same or different alkyl or aryl group of up to 8 carbon atoms, each $R^4$ is the same or different alkyl group of up to 6 carbon atoms and a is 0, 1 or 2. In one embodiment, $R^2$ possesses 1 to 4 carbon atoms, each $R^4$ is the same or different methyl, ethyl, propyl or isopropyl group and a is 0.

Specific isocyanatosilanes that can be used herein to react with the foregoing hydroxyl-terminated polyurethane prepolymers or polyol to provide silylated polyurethane herein include but are not limited to isocyanatopropyltrimethoxysilane, isocyanatoisopropyltrimethoxysilane, isocyanato-n-butyltrimethoxysilane, isocyanato-t-butyltrimethoxysilane, isocyanatopropyltriethoxysilane, isocyanatoisopropyltriethoxysilane, isocyanato-n-butyltriethoxysilane, isocyanato-t-butyltriethoxysilane, isocyanatomethyltriethoxysilane, isocyanatomethyltrimethoxysilane, isocyanatomethylmethyldimethoxysilane, 3-isocyanatopropylmethyldimethoxysilane, isocyanatomethylmethyldiethoxysilane, 3-isocyanatopropylmethyldiethoxysilane and the like.

In yet another embodiment, silylated polyurethane obtained from reacting isocyanatosilane directly with a polyol can be obtained from one or more polyols, advantageously, diols, reacting directly with isocyanatosilane without the initial formation of a polyurethane prepolymer.

The materials, i.e., polyols and silanes (e.g., one possessing both hydrolyzable and isocyanato functionality), useful for this approach to produce silylated polyurethane are described above. As such, suitable polyols include, hydroxy-terminated polyols having a molecular weight from about 4,000 to about 20,000. However, mixtures of polyols of various structures, molecular weights and/or functionalities can also be used based on the desired application. Suitable isocyanatosilanes used to react with the foregoing polyols to provide silylated polyurethanes are described above.

The silylated polyurethane polymer (i) is made using the same materials described above for the reactions (a), (b), and/or (c). The polyol (ii), hydroxyl-terminated polyurethane prepolymer (iii), isocyanato silylating agent (iv), polyisocyanate (v), isocyanate-terminated polyurethane prepolymer (vi), active hydrogen-containing silylating agent (vii), and yttrium-containing catalyst (viii) employed for the process of preparing silylated polyurethane polymer herein can be the same as those materials described herein for the contents of the silylated polyurethane-forming composition.

The polyurethane prepolymer synthesis and subsequent silylation reaction (a), as well as the direct reaction of polyol and isocyanatosilane (b) or the direct reaction of polyisocyanate and an active-hydrogen containing silane (c) are conducted under anhydrous conditions and preferably under an inert atmosphere, such as a blanket of nitrogen, to prevent premature hydrolysis of the alkoxysilane groups, and in the presence of an yttrium-containing catalyst, and optionally also in the presence of one of the other alternate polyurethane-forming catalysts described above. Typical temperature range for each of the reaction steps, is 0° to 150° C., and more preferably between 60° and 90° C. Typically, the total reaction time for the synthesis of the silylated polyurethane is between 4 to 8 hours.

The synthesis is monitored using a standard titration technique (ASTM 2572-87) or infrared analysis. Silylation of the urethane prepolymers is considered complete when no residual —NCO content can be detected by either technique.

The yttrium-containing catalyst employed in one or more of the reactions (a)-(c) described herein can be selected from the group consisting of an yttrium salt, a hydrate of an yttrium salt, an yttrium complex, an yttrium alkoxide, an organic yttrium compound, an inorganic yttrium compound, and combinations thereof. Preferably, the yttrium-containing catalyst is an yttrium salt selected from the group consisting of yttrium halide, yttrium nitrate, yttrium sulfate, yttrium trifluoromethanesulfonate, yttrium acetate, yttrium trifluoroacetate, yttrium malonate, octylic acid (2-ethylhexanoic acid) salt of yttrium, yttrium naphthenate, versatic acid salt of yttrium, yttrium neodecanoate, and combinations thereof. In another embodiment, the yttrium-containing catalyst is an yttrium alkoxide selected from the group consisting of yttrium trimethoxide, yttrium triethoxide, yttrium triisopropoxide, yttrium isopropoxide oxide, yttrium tributoxide, yttrium triphenoxide, and combinations thereof.

In one embodiment, the yttrium-containing catalyst has the general formula (IV):

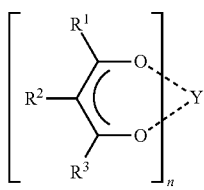

wherein, $R^1$, $R^2$ and $R^3$ each denote hydrogen or a substituent having 1-12 carbon atoms, preferably from 1 to about 6 carbon atoms; n is 2 or 3; O denotes an oxygen atom; and, Y denotes an yttrium atom. Preferably, $R^1$, $R^2$ and $R^3$ are each independently selected from hydrogen, methyl group, ethyl group, vinyl group, n-propyl group, isopropyl group, 1-propenyl group, allyl group, n-butyl group, s-butyl group, isobutyl group, t-butyl group, n-pentyl group, 1-methylbutyl group, 2-methylbutyl group, 3-methylbutyl group, 1,1-dimethylpropyl group, 1,2-dimethylpropyl group, 2,2-dimethylpropyl group, hexyl group, heptyl group, octyl group, nonyl group, decyl group, undecyl group, dodecyl group, cyclohexyl group, methyl cyclohexyl group, ethyl cyclohexyl group, phenyl group, benzyl group, tolyl group, phenethyl group and trifluoromethyl group.

The yttrium-containing catalyst can be an organic yttrium compound selected from the group consisting of yttrium tris(acetylacetonate), yttrium tris(hexanedionate), yttrium tris(heptanedionate), yttrium tris(dimethylheptanedionate, yttrium tris(tetramethylheptanedionate, yttrium tris (hexafluoroacetylacetonate), yttrium tris(trifluoroacetylacetonate), yttrium tris(acetoacetate), yttrium tris(ethylacetoacetate), cyclopentadienylyttrium dichloride, tris (methylcyclopentadienyl)yttrium, dicyclopentadienylyttrium chloride, tris(cyclopentadienyl) yttrium, tris(butylcyclopentadienyl) yttrium; tris[N,N-bis (trimethylsilyl)amide]yttrium, yttrium carbonate, yttrium hydrogen carbonate, and combinations thereof.

The yttrium-containing catalyst can be an organobasic complex selected from the group consisting of pyridine complexes of yttrium salt, picoline complexes of yttrium salt, and combinations thereof; an alcohol complex of an yttrium salt; an inorganic yttrium catalyst selected from the group consisting of yttrium oxide, diyttrium trioxide, yttrium sulfide, diyttrium trisulfide, yttrium nitrate, yttrium nitrate hexahydrate, yttrium barium copper oxide, yttrium hydroxide, yttrium aluminum garnet, yttrium aluminum silicate, yttrium phosphide, yttrium sulfate, yttrium tripolyphosphite, yttrium iron garnet, yttrium dichromate, yttrium chromate, yttrium permanganate, yttrium peroxide, and combinations thereof and the like.

The amounts of the various components described for reactions (a)-(c) described herein can vary greatly depending on various parameters, article or materials desired to be produced therewith and physical and processing parameters. In one embodiment, the reactants for forming the silylated polyurethane can be present in amounts of from 1 to about 99 weight percent, preferably from about 10 to about 75 weight percent, and most preferably from about 20-80 weight percent of the reaction components used to make the silylated polyurethane composition described herein.

The amount of yttrium-containing catalyst can be from about 10 to about 5000 parts per million by weight, preferably from about 20 to about 200 parts per million by weight. The amount of the alternate catalyst(s) described above can also be used in like amounts.

As noted above, the advantageous use of the yttrium-containing catalyst herein provides for a silylated polyurethane with reduced moisture sensitivity and increased storage stability compared to the same silylated polyurethane polymers prepared using non-yttrium containing catalysts. A reduced moisture sensitivity can be measured by exposing the silylated polyurethane to moisture and measuring the change in viscosity over time. In one embodiment the silylated polyurethane has approximately the same viscosity, e.g., within 5% of the original viscosity after formation, for a period of from about 12 hours to about 12 days, preferably from about 12 hours to about 15 days, more preferably from about 12 hours to about 30 days. Such viscosity measurements can be conducted in an atmosphere of approximately 50% relative humidity at 25° C.

The silylated polyurethane material formed by conducting one or more of the reactions (a), (b) and (c), can be cured in the presence of moisture, e.g., atmospheric moisture or added water solutions added thereto to form a cured resin material having a tensile strength of from about 20 psi to about 1500 psi and preferably from about 50 psi to about 1000 psi determined by ASTM D 412; a modulus at 100% elongation of from about 10 psi to about 1200 psi, preferably from about 20 psi to about 800 psi, determined by ASTM D 412; an elongation at break of from about 15% to about 800%, preferably from about 40% to about 500%, determined by ASTM D 412; and, a hardness of from about 5 Shore A to about 100 Shore A, preferably from about 10 Shore A to about 90 Shore A, as determined by ASTM C 661.

The silylated polyurethane composition described herein may also contain constituents that are also useful in crosslinkable materials, for example, silane moisture scavengers, plasticizers, adhesion promoter, organic solvents, catalyst and additives, all of which differ from the components described for the reactions (a), (b) and (c) for making the silylated polyurethane herein.

The plasticizers optionally used in the compositions may be any useful plasticizers. Examples of plasticizers are high-boiling hydrocarbons, for example, liquid paraffins, dialkylbenzenes, dialkylnaphthalenes or mineral oils consisting of naphthenic and paraffinic units, polyglycols, in particular polyoxypropylene glycols, which can optionally be substituted, high-boiling esters such as phthalates, citric acid esters or diesters of dicarboxylic acids, liquid polyesters, polyacrylates or polymethacrylates and alkanesulfonic acid esters.

If the compositions contain plasticizers, the amounts are preferably from about 1 to about 300 parts by weight, more preferably from 10 to 200 parts by weight, and in particular from about 20 to about 100 parts by weight, based in each case on 100 parts by weight of constituent. The compositions preferably contain plasticizers.

In one embodiment, the silylated polyurethane composition can optionally comprise rheology additives, such as, for example, surface treated fumed silica having a particle size of less and 12 nm, preferably, less than 7 nm. Some such surface-treated fumed silicas are those such as Evonik Aerosil R 974, R 9200, R 8200, R 805, R 104, R812 and 812S, and R-106. Cabot CAB-O-SIL ULTRABOND. The amounts of such rheology additives can range from about 4% up to about 40%, and will depend on the required properties.

The optional adhesion promoters may be any useful adhesion promoters, for example, organic compounds, silanes and organopolysiloxanes having functional groups such as those having epoxy, glycidoxypropyl, amino, amido, mercapto, carboxyl, anhydrido or methacryloyloxypropyl radicals, isocyanurate and tetraalkoxysilanes and siloxanes containing T or Q groups, which may optionally have alkoxy groups. If, however, another component, already has functional groups, an addition of adhesion promoter can be dispensed with. If the compositions contain adhesion promoters, the amounts are preferably from about 0.1 to about 50 parts by weight, more preferably from about 0.5 to about 20 parts by weight, and in particular from about 1 to about 10 parts by weight, based in each case on 100 parts by weight of moisture-curable silylated polyurethane. The compositions preferably contain adhesion promoters.

All conventional organic solvents can be used as optionally used organic solvents. Examples of organic solvents are organic solvents having a water content of less than about 1% by weight, in particular of less than about 0.05% by weight, for example alcohols such as methanol, ethanol, isopropanol, and 1,2-propanediol; ketones such as acetone or cyclohexanone; methyl ethyl ketoxime; esters such as butyl acetate, ethyl oleate, diethyl adipate, propylene carbonate, triethyl phosphate, glyceryl triacetate or dimethyl phthalate; ethers such as dipropylene glycol monomethyl ether, tetrahydrofuran or butoxyethoxyethyl acetate; amides such as N,N-dimethylacetamide or N,N-dimethylformamide; sulfoxides such as dimethyl sulfoxide; pyrrolidones such as N-methyl-2 pyrrolidone or N-octyl-2-pyrrolidone; hydrocarbons such as hexane, cyclohexane, octane, or dodecane; halogenated hydrocarbons such as trichloroethane or difluorotetrachloroethane; and aromatics such as alkylnaphthenes or alkylbenzenes. If the compositions contain organic solvents (H), the amounts are preferably from about 0.1 to about 10 parts by weight, more preferably from about 0.2 to about 5 parts by weight, and in particular from about 0.5 to about 2 parts by weight, based in each case on 100 parts by weight of moisture-curable silylated polyurethane. The compositions preferably contain organic solvent.

In another embodiment herein there is provided a sealant, an adhesive or coating comprising the silylated polyurethane formed by reacting the reactants present in the reactions (a), (b), or (c) described herein. The sealant, adhesive or coating can contain the silylated polyurethane in an amount of from about 1% to about 99% by weight, preferably from about 1 to about 95% and most preferably from about 1% to about 90% by weight. In one non-limiting embodiment herein the sealant, adhesive or coating is the same as the silylated polyurethane described herein.

There is also provided herein a process of making a silylated polyurethane as described herein and above. The mixing can be conducted with conventional equipment as will be known by those skilled in the art. The addition of the components for one or more of the reactions (a), (b) and/or (c) and any optional components, can be conducted simultaneously, or with any permutation or combination of methods of addition of these components.

The silylated polyurethane compositions of this invention, or sealant or adhesives containing the same, are useful in coating applications and in caulking and sealing applications on buildings, airplanes, bathroom fixtures, automotive equipment or wherever elastomeric polymers with improved elongation and flexibility are desired. Another desirable feature of these silylated polyurethane compositions is their ability to be applied to moist or wet surfaces and be cured into a cross-linked elastomer without deleterious effects, which cured product becomes tack-free within a relatively short period of time. Moreover, the cured compositions of this invention strongly adhere alone or with the aid of a primer to a wide variety of substrates such as glass, porcelain, wood, metals, polymeric materials and the like making them especially suited for any type of caulking, adhesive or laminating application.

The compositions of the present invention provide a combination of the desirable properties of silylated polyurethane polymers such as tear resistance, extensibility, elastic recovery, and the like, while at the same time providing the desirable properties of improved elongation and flexibility and lower modulus of elasticity. Improved elongation and lower modulus of elasticity, e.g., can significantly reduce the stresses on polyurethane sealants at the interface of the substrate during expansions and contractions of joints. These properties help to minimize adhesive failure of the sealants.

While the invention has been described with reference to a number of embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to any particular embodiment disclosed herein.

EXAMPLES

The following nonrestrictive examples are further illustrative of the invention.

As will be demonstrated herein below in Table 1, the silylated polyurethane polymers prepared using yttrium catalysts as detailed in the Examples 1-3 of the invention herein below, have a range of desirable properties depending on the reactants and reaction conditions employed, and these properties are similar to those achieved when using tin and bismuth catalysts such as those of the Comparative Examples 1 and 2 set out below. The properties of the various silylated polyurethane polymers are suitable for use in a range of adhesive and sealant applications.

The silylated polyurethane polymers prepared in Examples 1-3 using yttrium compounds as catalysts show reduced sensitivity to moisture compared with the silylated polyurethane polymers prepared in Comparative Examples 1 and 2 using conventional tin and bismuth compounds.

The silylated polyurethane polymers obtained in Examples 1-3 are formulated into sealant compositions and cured in Examples 5-7 and the properties of the cured sealants, as set out in Table 2 below demonstrate that the silylated polyurethane polymers of the invention prepared using yttrium catalysts can be formulated into sealants with desirable properties that are comparable to those produced from a silylated polyurethane polymer obtained by employing a tin catalyst (Comparative Example 3). Examples 5 and 6 show that silylated polyurethane polymers prepared with yttrium catalysts can be used to prepare sealant formulations that are completely tin-free by using a titanium curing catalyst. Examples 6 and 7 show that a silylated polyurethane polymer made using an yttrium catalyst can be formulated into sealants with very similar properties when using a titanium curing catalyst and a tin curing catalyst, respectively.

Example 1

To a four-neck 1 L round bottom flask equipped with an overhead mechanical agitator, nitrogen line, stopper and thermocouple were charged 368.8 g of poly(propylene oxide) diol (HMBT-120, Zhejiang Huangma) and 1.80 g of Irganox 1135 (BASF). The mixture was dried by sparging with nitrogen while heating at 80° C. with a heating mantle for 120 minutes. The temperature was then set at 72° C. 0.02 g of yttrium tris(acetylacetonate) (Strem) was charged and mixed for 20 minutes. 3.79 g of isophorone diisocyanate (Desmodur I, Covestro) was charged and heated for 68 minutes until the isocyanate concentration of the mixture was 0.05% and the viscosity was 34,500 cP. 7.70 g of γ-isocyanatopropyltrimethoxysilane (Silquest A-Link 35, Momentive Performance Materials) was added and the reaction mixture was heated to 80° C. After a further 63 minutes the isocyanate concentration of the mixture was 0.12% and the viscosity was 60,000 cP at which point 7.92 g of a solution of vinyltrimethoxysilane (Silquest A-171, Momentive Performance Materials) and methanol (6 wt. % methanol) was charged. The mixture was then allowed to cool slowly to room temperature. The viscosity of the finished silylated polyurethane polymer was 50,600 cP, and isocyanate was not detectable.

Example 2

To a four-neck 1 L round bottom flask equipped with an overhead mechanical agitator, nitrogen line, stopper and thermocouple were charged 366.3 g of poly(propylene oxide) diol (HMBT-120, Zhejiang Huangma) and 1.80 g of Irganox 1135 (BASF). The mixture was dried by sparging with nitrogen while heating at 80° C. with a heating mantle for 140 minutes. The temperature was then set at 72° C. 0.067 g of yttrium triisopropoxide (Strem) was charged and mixed for 14 minutes. 3.75 g of isophorone diisocyanate (Desmodur I, Covestro) was charged and heated for 1402 minutes until the isocyanate concentration of the mixture was 0.06% and the viscosity was 63,300 cP. 7.46 g of γ-isocyanatopropyltrimethoxysilane (Silquest A-Link 35, Momentive Performance Materials) was added and the reaction mixture was heated to 80° C. After a further 308 minutes the isocyanate concentration of the mixture was 0.05% and the viscosity was 89,500 cP at which point 7.27 g of a solution of vinyltrimethoxysilane (Silquest A-171, Momentive Performance Materials) and methanol (6 wt % methanol) was charged. The mixture was then allowed to cool slowly to room temperature. The viscosity of the finished silylated polyurethane polymer was 71,400 cP, and isocyanate was not detectable.

Comparative Example 1

To a four-neck 1 L round bottom flask equipped with an overhead mechanical agitator, nitrogen line, stopper and thermocouple were charged 314.4 g of poly(propylene oxide) diol (HMBT-120, Zhejiang Huangma) and 1.60 g of Irganox 1135 (BASF). The mixture was dried by sparging with nitrogen while heating at 80° C. with a heating mantle for 120 minutes. The temperature was then set at 72° C. 0.233 mL of a 10% solution of dibutyltin dilaurate (Fomrez SUL-4, Momentive Performance Materials) in toluene was charged and mixed for 15 minutes. 3.21 g of isophorone diisocyanate (Desmodur I, Covestro) was charged and heated for 80 minutes until the isocyanate concentration of the mixture was 0.04% and the viscosity was 33,179 cP. 6.39 g of γ-isocyanatopropyltrimethoxysilane (Silquest A-Link 35, Momentive Performance Materials) was added and the reaction mixture was heated to 80° C. After a further 198 minutes the isocyanate concentration of the mixture was 0.03% and the viscosity was 61,040 cP at which point 6.56 g of a solution of vinyltrimethoxysilane (Silquest A-171, Momentive Performance Materials) and methanol (6 wt. % methanol) was charged. The mixture was then allowed to cool slowly to room temperature. The viscosity of the finished silylated polyurethane polymer was 50,959 cP, and isocyanate was not detectable.

Comparative Example 2

To a four-neck 1 L round bottom flask equipped with an overhead mechanical agitator, nitrogen line, stopper and thermocouple were charged 318.1 g of poly(propylene oxide) diol (HMBT-120, Zhejiang Huangma) and 1.60 g of Irganox 1135 (BASF). The mixture was dried by sparging with nitrogen while heating at 80° C. with a heating mantle for 85 minutes. The temperature was then set at 60° C. 0.024 g of an organobismuth compound (Coscat 83, Vertellus Performance Materials) was charged and mixed for 29 minutes. 3.25 g of isophorone diisocyanate (Desmodur I, Covestro) was charged and heated for 15 minutes until the isocyanate concentration of the mixture was 0.03% and the viscosity was 38,577 cP. 6.73 g of γ-isocyanatopropyltrimethoxysilane (Silquest A-Link 35, Momentive Performance Materials) was added. After a further 15 minutes the isocyanate concentration of the mixture was 0.04% and the viscosity was 82,392 cP at which point 6.91 g of a solution of vinyltrimethoxysilane (Silquest A-171, Momentive Performance Materials) and methanol (6 wt. % methanol) was charged. The mixture was then allowed to cool slowly to room temperature. The viscosity of the finished silylated polyurethane polymer was 74,931 cP, and isocyanate was not detectable.

Example 3

To a four-neck 1 L round bottom flask equipped with an overhead mechanical agitator, nitrogen line, stopper and thermocouple were charged 305.3 g of poly(propylene oxide) diol (Acclaim 18200N, Covestro) and 1.60 g of Irganox 1135 (BASF). The mixture was dried by sparging with nitrogen while heating at 80° C. with a heating mantle for 146 minutes. 0.019 g of yttrium tris(acetylacetonate) (Strem) was charged and mixed for 18 minutes. 7.19 g of γ-isocyanatopropyltrimethoxysilane (Silquest A-Link 35, Momentive Performance Materials) was added. After 151 minutes isocyanate was not detectable, and the viscosity was 38,497 cP at which point 6.47 g of a solution of vinyltrimethoxysilane (Silquest A-171, Momentive Performance Materials) and methanol (6 wt. % methanol) was charged. The mixture was then allowed to cool slowly to room temperature. The viscosity of the finished silylated polyurethane polymer was 36,354 cP, and isocyanate was not detectable.

Example 4

To a four-neck 1 L round bottom flask equipped with an overhead mechanical agitator, nitrogen line, stopper and thermocouple was charged 299.6 g of polybutadiene diol (Krasol LBH-P 3000, Total Cray Valley). The polyol was dried by sparging with nitrogen while heating at 80° C. with a heating mantle for 115 minutes. 0.043 g of yttrium tris(acetylacetonate) (Strem) was charged and mixed for 50 minutes. 6.22 g of isophorone diisocyanate (Desmodur I, Covestro) was charged and heated for 192 minutes until isocyanate was not detectable and the viscosity was 82,551 cP. 28.00 g of γ-isocyanatopropyltrimethoxysilane (Silquest A-Link 35, Momentive Performance Materials) was added. After a further 200 minutes isocyanate was not detectable and viscosity was 155,000 cP at which point 2.75 g of a solution of vinyltrimethoxysilane (Silquest A-171, Momentive Performance Materials) and methanol (13 wt. % methanol) was charged. The mixture was then allowed to cool slowly to room temperature. The final product viscosity was 150,000 cP, and isocyanate was not detectable.

Each silylated polyurethane polymer of Examples 1~4 and Comparative Examples 1-2 was mixed with 0.5% dibutyltin dilaurate and 1% of a solution of potassium hydroxide/water/methanol (1:20:5 parts by weight), based on the weight of the silylated polyurethane polymer, and then cast into a film and cured in an oven at 50° C. for 1 day. Tensile properties of the cured sheets were tested according to ASTM D 412, and hardness was tested according to ASTM C 661. The test results are listed in the following Table 1:

TABLE 1

| Silylated Polymer | Catalyst | Tensile strength at break (psi) | Modulus at 100% elongation (psi) | Elongation at break (%) | Hardness (Shore A) |
|---|---|---|---|---|---|
| Example 1 | Y(acac)$_3$ | 69 | 44 | 215 | 15 |
| Example 2 | Y(O$^i$Pr)$_3$ | 97 | 69 | 186 | 24 |
| Comparative Example 1 | DBTDL | 73 | 77 | 171 | 28 |
| Comparative Example 2 | Organobismuth | 96 | 58 | 245 | 20 |
| Example 3 | Y(acac)$_3$ | 64 | 76 | 150 | 26 |
| Example 4 | Y(acac)$_3$ | 98 | — | 46 | 46 |

The moisture sensitivity of the silylated polyurethane polymers of Examples 1-3 and Comparative Examples 1-2 was evaluated by measuring viscosity after exposure to atmospheric moisture. A 15 g sample of each polymer was weighed into an aluminum pan of 5 cm diameter, and the sample was stored in a climate-controlled room at 50% relative humidity and 25° C. The viscosity of the aged samples was measured periodically. The samples prepared using yttrium compounds as catalysts show a much slower increase in viscosity, i.e. they display reduced sensitivity to moisture. The test results are shown in Chart 1.

Example 5

The silylated polyurethane polymer of Example 1 was formulated into a sealant using the titanium-based catalyst Tytan S2. In a speed mixer were mixed: 22.95 g of the silylated polyurethane polymer of Example 1, 0.46 g of ultraviolet light absorber (BLS 1326, Mayzo), 18.35 g of diisodecyl phthalate (Jayflex DIDP, ExxonMobil), 33.00 g of precipitated calcium carbonate (Ultra-Pflex, Specialty Minerals), 22.00 g of ground calcium carbonate (Hi-Pflex, Specialty Minerals), 1.15 g of fumed silica (CAB-O-SIL TS-530, Cabot), 1.15 g of titanium dioxide (Ti-Pure, Chemours), 0.57 g of 3-aminopropyltrimethoxysilane (Silquest A-1110, Momentive Performance Materials), 0.34 g of vinyltrimethoxysilane (Silquest A-171, Momentive Performance Materials), 0.07 of 1,8-Diazabicyclo[5.4.0]undec-7-ene (Sigma-Aldrich), and 0.07 g of titanium chelate complex (Tytan S2, Borica). The resulting sealant was cast into a film and cured in a climate-controlled room at 50% relative humidity and 25° C. for 7 days. Tensile properties of the cured sheets were tested according to ASTM D 412, and hardness was tested according to ASTM C 661.

Example 6

The silylated polyurethane polymer of Example 2 was formulated into a sealant using the titanium-based catalyst Tytan S2. In a speed mixer were mixed: 22.95 g of the silylated polyurethane polymer of Example 2, 0.46 g of ultraviolet light absorber (BLS 1326, Mayzo), 18.35 g of diisodecyl phthalate (Jayflex DIDP, ExxonMobil), 33.00 g of precipitated calcium carbonate (Ultra-Pflex, Specialty Minerals), 22.00 g of ground calcium carbonate (Hi-Pflex, Specialty Minerals), 1.15 g of fumed silica (CAB-O-SIL TS-530, Cabot), 1.15 g of titanium dioxide (Ti-Pure, Chemours), 0.57 g of 3-aminopropyltrimethoxysilane (Silquest A-1110, Momentive Performance Materials), 0.34 g of vinyltrimethoxysilane (Silquest A-171, Momentive Performance Materials), 0.07 of 1,8-Diazabicyclo[5.4.0]undec-7-ene (Sigma-Aldrich), and 0.07 g of titanium chelate complex (Tytan S2, Borica). The resulting sealant was cast into a film and cured in a climate-controlled room at 50% relative humidity and 25° C. for 7 days. Tensile properties of the cured sheets were tested according to ASTM D 412, and hardness was tested according to ASTM C 661.

Example 7

The silylated polyurethane polymer of Example 2 was formulated into a sealant using the tin-based catalyst dibutyltin dilaurate. In a speed mixer were mixed: 22.95 g of the silylated polyurethane polymer of Example 2, 0.46 g of ultraviolet light absorber (BLS 1326, Mayzo), 18.35 g of diisodecyl phthalate (Jayflex DIDP, ExxonMobil), 33.00 g of precipitated calcium carbonate (Ultra-Pflex, Specialty Minerals), 22.00 g of ground calcium carbonate (Hi-Pflex, Specialty Minerals), 1.15 g of fumed silica (CAB-O-SIL TS-530, Cabot), 1.15 g of titanium dioxide (Ti-Pure, Chemours), 0.57 g of 3-aminopropyltrimethoxysilane (Silquest A-1110, Momentive Performance Materials), 0.34 g of vinyltrimethoxysilane (Silquest A-171, Momentive Performance Materials), and 0.035 g of dibutyltin dilaurate (Fomrez SUL-4, Momentive Performance Materials). The resulting sealant was cast into a film and cured in a climate-controlled room at 50% relative humidity and 25° C. for 7 days. Tensile properties of the cured sheets were tested according to ASTM D 412, and hardness was tested according to ASTM C 661.

Comparative Example 3

The silylated polyurethane polymer of Comparative Example 1 was formulated into a sealant using the tin-based catalyst dibutyltin dilaurate. In a speed mixer were mixed: 22.95 g of the silylated polyurethane polymer of Comparative Example 1, 0.46 g of ultraviolet light absorber (BLS 1326, Mayzo), 18.35 g of diisodecyl phthalate (Jayflex DIDP, ExxonMobil), 33.00 g of precipitated calcium carbonate (Ultra-Pflex, Specialty Minerals), 22.00 g of ground calcium carbonate (Hi-Pflex, Specialty Minerals), 1.15 g of fumed silica (CAB-O-SIL TS-530, Cabot), 1.15 g of titanium dioxide (Ti-Pure, Chemours), 0.57 g of 3-aminopropyltrimethoxysilane (Silquest A-1110, Momentive Performance Materials), 0.34 g of vinyltrimethoxysilane (Silquest A-171, Momentive Performance Materials), and 0.035 g of dibutyltin dilaurate (Fomrez SUL-4, Momentive Performance Materials). The resulting sealant was cast into a film and cured in a climate-controlled room at 50% relative humidity and 25° C. for 7 days. Tensile properties of the cured sheets were tested according to ASTM D 412, and hardness was tested according to ASTM C 661.

The test results of the four sealants are listed in the following Table 2:

TABLE 2

| Sealant Formulation | Silylated Polymer | Tensile strength at break (psi) | Modulus at 100% elongation (psi) | Elongation at break (%) | Hardness (Shore A) |
|---|---|---|---|---|---|
| Example 5 | Example 1 | 180 | 84 | 463 | 19 |
| Example 6 | Example 2 | 201 | 87 | 698 | 27 |
| Example 7 | Example 2 | 212 | 103 | 504 | 30 |
| Comparative Example 3 | Comparative Example 1 | 227 | 125 | 405 | 39 |

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

The invention claimed is:

1. A silylated polyurethane composition comprising:
the reaction product of a polyol, an isocyanatosilane silylating agent, and an yttrium-containing catalyst, wherein the reaction product of the polyol comprises a polymer of Formula (I):

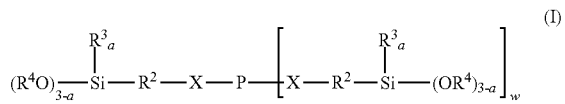

where P is a polymer; X is a urethane, urea or thiourea; $R^2$ is a divalent alkylene group of up to 12 carbon atoms, optionally containing one or more heteroatoms, each $R^3$ is the same or different alkyl or aryl group of up to 8 carbon atoms, each $R^4$ is the same or different alkyl group of up to 6 carbon atoms, w is greater than or equal to 1, and a is 0, 1 or 2; and, an yttrium-containing catalyst
wherein the polymer of formula (I) has increased storage stability compared to the same polymer prepared without the yttrium-containing catalyst.

2. The silylated polyurethane polymer of claim 1, wherein the silylated polyurethane polymer is of the formula (IA):

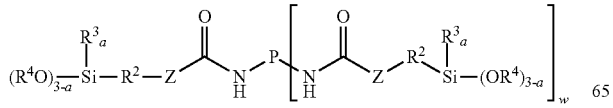

wherein P is a polymer derived from a polyisocyanate and/or a polyol, Z is S or N—$R^1$, $R^1$ is hydrogen, alkyl or cycloalkyl of up to 12 carbon atoms, optionally containing one or more heteroatoms, or aryl of up to 8 carbon atoms, $R^2$ is a divalent alkylene group of up to 12 carbon atoms, optionally containing one or more heteroatoms, each $R^3$ is the same or different alkyl or aryl group of up to 8 carbon atoms, each $R^4$ is the same or different alkyl group of up to 6 carbon atoms, w is greater than or equal to 1, a is 0, 1 or 2, and w is greater than or equal to 1.

3. The silylated polyurethane polymer of claim 1 wherein the silylated polyurethane polymer is of the formula (IIA):

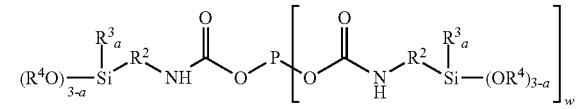

wherein P is a polymer $R^2$ is a divalent alkylene group of up to 12 carbon atoms, optionally containing one or more heteroatoms, each $R^3$ is the same or different alkyl or aryl group of up to 8 carbon atoms, each $R^4$ is the same or different alkyl group of up to 6 carbon atoms, a is 0, 1 or 2, and w is greater than or equal to 1.

4. The silylated polyurethane composition of claim 3 where in formula (IIA) $R^2$ possesses 1 to 4 carbon atoms, each $R^4$ is the same or different group selected from the group consisting of methyl, ethyl, propyl or isopropyl group and a is 0.

5. The silylated polyurethane composition of claim 1, wherein the yttrium-containing catalyst is selected from the group consisting of an yttrium salt, a hydrate of an yttrium salt, an yttrium complex, an yttrium alkoxide, an organic yttrium compound, an inorganic yttrium compound, and combinations thereof.

6. The silylated polyurethane composition of claim 1, wherein the yttrium-containing catalyst is an yttrium salt selected from the group consisting of yttrium halide, yttrium nitrate, yttrium sulfate, yttrium trifluoromethanesulfonate, yttrium acetate, yttrium trifluoroacetate, yttrium malonate, octylic acid (ethyl hexanoic acid) salt of yttrium, yttrium naphthenate, versatic acid salt of yttrium, yttrium neodecanoate, yttrium carbonate, yttrium hydrogen carbonate, and combinations thereof.

7. The silylated polyurethane composition of claim 1, wherein the yttrium-containing catalyst is an yttrium alkoxide selected from the group consisting of yttrium trimethoxide, yttrium triethoxide, yttrium triisopropoxide, yttrium isopropoxide oxide, yttrium tributoxide, yttrium triphenoxide, and combinations thereof.

8. The silylated polyurethane composition of claim 1, wherein the yttrium-containing catalyst has the general formula (IV):

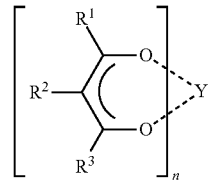

wherein, $R^1$, $R^2$ and $R^3$ each denote hydrogen or a substituent having 1-12 carbon atoms; n is 2 or 3; O denotes an oxygen atom; and, Y denotes an yttrium atom.

9. The silylated polyurethane composition of claim 8, wherein $R^1$, $R^2$ and $R^3$ are each independently selected from hydrogen, methyl group, ethyl group, vinyl group, n-propyl group, isopropyl group, 1-propenyl group, allyl group, n-butyl group, s-butyl group, isobutyl group, t-butyl group, n-pentyl group, 1-methylbutyl group, 2-methylbutyl group, 3-methylbutyl group, 1,1-dimethylpropyl group, 1,2-dimethylpropyl group, 2,2-dimethylpropyl group, hexyl group, heptyl group, octyl group, nonyl group, decyl group, undecyl group, dodecyl group, cyclohexyl group, methylcyclohexyl group, ethylcyclohexyl group, phenyl group, benzyl group, tolyl group, phenethyl group and trifluoromethyl group.

10. The silylated polyurethane composition of claim 1, wherein the yttrium-containing catalyst is an organic yttrium compound selected from the group consisting of yttrium tris(acetylacetonate, yttrium tris(hexanedionate), yttrium tris (heptanedionate), yttrium tris(dimethylheptane dionate), yttrium tris(tetramethylheptanedionate), yttrium tris (hexafluoroacetylacetonate), yttrium tris(trifluoroacetylacetonate), yttrium tris(acetoacetate), yttrium tris(ethylacetoacetate), cyclopentadienylyttrium dichloride, tris (methylcyclopentadienyl)yttrium, dicyclopentadienylyttrium dichloride, tricyclopentadienyl yttrium, tris(butylcyclopentadienyl)yttrium; tris[N,N-bis(trimethylsilyl)amide]yttrium, and combinations thereof.

11. The silylated polyurethane composition of claim 1, wherein the yttrium-containing catalyst is an organobasic complex selected from the group consisting of pyridine complexes of yttrium salt, picoline complexes of yttrium salt, and combinations thereof.

12. The silylated polyurethane composition of claim 1, wherein the yttrium-containing catalyst is an alcohol complex of an yttrium salt.

13. The silylated polyurethane composition of claim 1, wherein the yttrium-containing catalyst is an inorganic yttrium catalyst selected from the group consisting of yttrium oxide, diyttrium trioxide, yttrium sulfide, diyttrium trisulfide, yttrium nitrate, yttrium (III) nitrate hexahydrate, yttrium barium copper oxide, yttrium hydroxide, yttrium aluminum garnet, yttrium aluminum silicate, yttrium phosphide, yttrium sulfate, yttrium tripolyphosphite, yttrium iron garnet, yttrium silver, yttrium dichromate, yttrium chromate, yttrium permanganate, yttrium peroxide, and combinations thereof.

14. A process for the preparation of silylated polyurethane polymer (i) from the reaction of polyol (ii) and/or hydroxyl-terminated polyurethane prepolymer (iii) with isocyanatosilane silylating agent (iv), or the reaction of polyisocyanate (v) and/or isocyanate-terminated polyurethane prepolymer (vi) with active hydrogen-containing silylating agent (vii), the process comprising:
employing at least one yttrium-containing catalyst (viii) for the preparation of the hydroxyl-terminated polyurethane prepolymer (iii), isocyanate-terminated polyurethane prepolymer (vi) and/or silylated polyurethane polymer (i).

15. The process of claim 14 wherein the yttrium-containing catalyst (viii) is selected from the group consisting of an yttrium salt, a hydrate of an yttrium salt, an yttrium complex, an yttrium alkoxide, an organic yttrium compound, an inorganic yttrium compound, and combinations thereof.

16. The process of claim 14 wherein the yttrium-containing catalyst (viii) is an yttrium salt selected from the group consisting of yttrium halide, yttrium nitrate, yttrium sulfate, yttrium trifluoromethanesulfonate, yttrium acetate, yttrium trifluoroacetate, yttrium malonate, octylic acid (ethyl hexanoic acid) salt of yttrium, yttrium naphthenate, versatic acid salt of yttrium, yttrium neodecanoate, yttrium carbonate, yttrium hydrogen carbonate, and combinations thereof.

17. The process of claim 14 wherein the yttrium-containing catalyst (viii) is an yttrium alkoxide selected from the group consisting of yttrium trimethoxide, yttrium triethoxide, yttrium triisopropoxide, yttrium isopropoxide oxide, yttrium tributoxide, yttrium triphenoxide, and combinations thereof.

18. The process of claim 14 wherein the yttrium-containing catalyst (viii) has the general formula (IV):

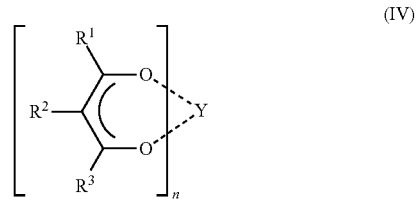

(IV)

wherein, $R^1$, $R^2$ and $R^3$ each denote hydrogen or a substituent having 1-12 carbon atoms; n is 2 or 3; O denotes an oxygen atom; and, Y denotes an yttrium atom.

19. The process of claim 18 wherein the yttrium-containing catalyst (viii) of formula
(IV) is such that $R^1$, $R^2$ and $R^3$ are each independently selected from hydrogen, methyl group, ethyl group, vinyl group, n-propyl group, isopropyl group, 1-propenyl group, allyl group, n-butyl group, s-butyl group, isobutyl group, t-butyl group, n-pentyl group, 1-methyl butyl group, 2-methyl butyl group, 3-methyl butyl group, 1,1-dimethyl propyl group, 1,2-dimethyl propyl group, 2,2-dimethylpropyl group, hexyl group, heptyl group, octyl group, nonyl group, decyl group, undecyl group, dodecyl group, cyclohexyl group, methyl cyclohexyl group, ethyl cyclohexyl group, phenyl group, benzyl group, tolyl group, phenethyl group, and trifluoromethyl group.

20. The process of claim 14 wherein the yttrium-containing catalyst (viii) is an organic yttrium compound selected from the group consisting of yttrium tris(acetylacetonate), yttrium tris(hexanedionate), yttrium tris(heptanedionate), yttrium tris(dimethylheptanedionate), yttrium tris(tetramethylheptanedionate), yttrium tris(hexafluoroacetylacetonate), yttrium tris(trifluoroacetylacetonate), yttrium tris(acetoacetate), yttrium tris(ethylacetoacetate), cyclopentadienylyttrium dichloride, tris(methylcyclopentadienyl)yttrium, dicyclopentadienylyttrium dichloride, tricyclopentadienylyttrium, tris(butylcyclopentadienyl)yttrium; tris[N,N-bis(trimethylsilyl)amide]yttrium, and combinations thereof.

21. The process of claim 14 wherein the yttrium-containing catalyst (viii) is an organobasic complex selected from the group consisting of pyridine complexes of yttrium salt, picoline complexes of yttrium salt, and combinations thereof.

22. The process of claim 14 wherein the yttrium-containing catalyst (viii) is an alcohol complex of an yttrium salt.

23. The process of claim 14 wherein the yttrium-containing catalyst (viii) is an inorganic yttrium catalyst selected from the group consisting of yttrium oxide, diyttrium trioxide, yttrium sulfide, diyttrium trisulfide, yttrium nitrate, yttrium (III) nitrate hexahydrate, yttrium barium copper oxide, yttrium hydroxide, yttrium aluminum garnet, yttrium aluminum silicate, yttrium phosphide, yttrium sulfate, yttrium tripolyphosphite, yttrium iron garnet, yttrium dichromate, yttrium chromate, yttrium permanganate, yttrium peroxide, and combinations thereof.

24. An adhesive, sealant, or coating comprising the silylated polyurethane composition of claim 1.

25. A silylated polyurethane composition comprising the reaction product of a polyisocyanate, an active hydrogen-containing silane, and, an yttrium-containing catalyst, wherein the reaction product comprises a polymer of Formula (I):

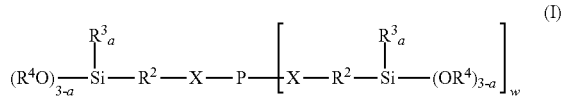

where P is a polymer; X is a urethane, urea or thiourea; $R^2$ is a divalent alkylene group of up to 12 carbon atoms, optionally containing one or more heteroatoms, each $R^3$ is the same or different alkyl or aryl group of up to 8 carbon atoms, each $R^4$ is the same or different alkyl group of up to 6 carbon atoms, w is greater than or equal to 1, and a is 0, 1 or 2; and, an yttrium-containing catalyst.

26. The silylated polyurethane polymer of claim 25, wherein the silylated polyurethane polymer is of the formula (IA):

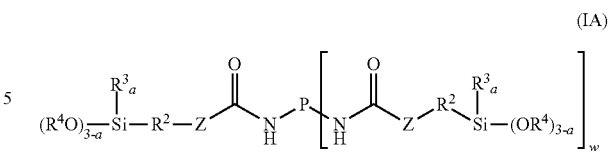

wherein P is a polymer derived from a polyisocyanate and/or a polyol, Z is S or N—$R^1$, $R^1$ is hydrogen, alkyl or cycloalkyl of up to 12 carbon atoms, optionally containing one or more heteroatoms, or aryl of up to 8 carbon atoms, $R^2$ is a divalent alkylene group of up to 12 carbon atoms, optionally containing one or more heteroatoms, each $R^3$ is the same or different alkyl or aryl group of up to 8 carbon atoms, each $R^4$ is the same or different alkyl group of up to 6 carbon atoms, w is greater than or equal to 1, a is 0, 1 or 2, and w is greater than or equal to 1.

27. The silylated polyurethane polymer of claim 25 wherein the silylated polyurethane polymer is of the formula (IIA):

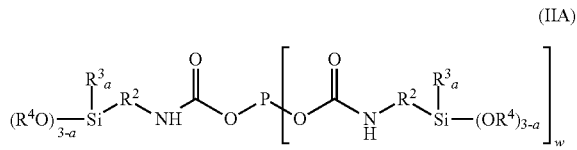

wherein P is a polymer $R^2$ is a divalent alkylene group of up to 12 carbon atoms, optionally containing one or more heteroatoms, each $R^3$ is the same or different alkyl or aryl group of up to 8 carbon atoms, each $R^4$ is the same or different alkyl group of up to 6 carbon atoms, a is 0, 1 or 2, and w is greater than or equal to 1.

* * * * *